United States Patent Office 2,904,542
Patented Sept. 15, 1959

2,904,542

OLEFIN POLYMERIZATION PROCESS

Egi Victor Fasce, Baton Rouge, and Neville Leverne Cull, Baker, La., assignors to Esso Research and Engineering Company, a corporation of Delaware No Drawing. Application October 25, 1955
Serial No. 542,790

3 Claims. (Cl. 260—94.9)

This invention relates to an improved process for polymerizing ethylene or other lower olefins with a combination catalyst comprising a reducing agent, such as an alkyl metal compound, in conjunction with a reducible compound of a metal of the secondary groups IV to VI of the periodic system, e.g. titanium tetrachloride. When these catalyst components are mixed together, preferably in the presence of a volatilizable inert liquid or solvent, generally some precipitate forms, and is kept dispersed as a slurry by agitation.

In carrying out a polymerization of this general type, the olefin such as ethylene, is passed into a suitable inert diluent liquid such as heptane, containing the above-mentioned type of catalyst dissolved or dispersed therein, the polymerization temperature being suitably controlled at between room temperature and about 150° C., generally about 50–100° C., with a pressure ranging from atmospheric to 5 or 10 atmospheres or so. The reaction liquid is generally agitated thoroughly during the feeding of ethylene, and becomes progressively thicker due to formation of finely divided solid polymer in suspension in the liquid, and may be, and is often, diluted with additional inert diluent during the polymerization in order to maintain a stirrable reaction mass.

This process has heretofore been carried out by batch operation because of difficulties in maintaining the proper control of catalyst activity, and of recovering the polymer slurry in such a manner as to avoid fire or explosion, since the catalyst is subject to spontaneous ignition and also the diluent and even the polymer are combustible. Also, there are difficulties even in the batch polymerization in that catalyst activity tends to be irregular and sometimes the polymerization stops before a desired high yield of polymer (on the basis of amount of catalyst used) is obtained. It has previously been suggested that when catalyst activity becomes reduced, addition of extra reducing agent, e.g. aluminum alkyl, will serve to reactivate the catalyst; however, that is not a complete solution to the difficulties, and is mostly only applicable to batch operation.

One purpose of the present invention is to provide a way of insuring better catalyst activity and extending the operating period in batch polymerization, to the extent of obtaining higher yields and smoother operation. This improved process also lends itself better to continuous operation than prior processes using this type of combination catalyst.

Broadly, this invention comprises starting the polymerization reaction with a controlled amount of catalyst just sufficient to start active polymerization, and then adding additional small amounts of both of the separate liquid catalyst components during the course of polymerization, when carried out either batchwise or continuously. The invention may be carried out in a number of different ways. For instance, after the polymerization has been initiated with a catalyst comprising, for example, a reaction product of aluminum triethyl with titanium tetrachloride, and the polymerization has proceeded with good activity, separate small additional amounts of aluminum triethyl and $TiCl_4$ are added, preferably as solutions thereof in heptane or other suitable diluent. A further modification, particularly applicable to continuous operation, recycle catalyst solution filtrate or slurry, from which the polymer produced has been separated, may be added back into the polymerization zone at one or more stages in the polymerization. Thus, recycle catalyst may be used to start polymerization, to be followed by periodic additions of both separate catalyst components; or alternatively, the recycle catalyst may be fed back to the reactor, subsequent to the original starting of the polymerization reaction, and may be supplemented by additions of either or both of the separate catalyst components.

The reducing agent catalyst component, instead of being aluminum triethyl as mentioned hereinabove, may be any aluminum alkyl compound having the general formula $R_3Al$ or $R_2AlX$, in which R is an alkyl radical having up to 20 carbon atoms or so, but preferably about 2 to 12 carbon atoms, such as ethyl, isobutyl, dodecyl, etc. Examples of such aluminum alkyl compounds are $Al(C_4H_9)_3$, $Al(C_{12}H_{25})_3$ and $Al(C_4H_9)_2Cl$. Alternatively, R may be an aryl group such as phenyl, toluyl, xylyl, etc., or a cyclic aliphatic radical such as cyclohexyl. X is preferably a halogen, preferably Cl, Br, or F, but may also be an alkoxy group, e.g. $OCH_3$, $OC_2H_5$, etc. or aroxy, e.g. $OC_6H_5$, but also may be a radical of a secondary amine, acid amide, mercaptan, thiophenol, carboxylic acid, etc. Other metal alkyl compounds may be used such as organo metal dialkyls of magnesium or zinc, e.g. dimethyl magnesium, diethyl zinc, etc. Other usable reducing agents include metal aryl compounds, e.g. phenol compounds of the Al, Zn, Mg or Na, either alone or together with some Al trialkyl, or a dialkyl aluminum halide. Further, mixed reducing agents may be used such as a mixture of an alkali metal with an organo metal compound of Al, Mg or Zn, as, for instance, a mixture of sodium and tridodecyl aluminum. To keep the reaction going, it is also feasible to add aluminum alkyl dichlorides of the formula $AlRCl_2$ wherein R is an alkyl group of 2 to 8 carbon atoms, e.g. $Al(C_2H_5)Cl_2$.

The proportions in which the two catalyst components should be mixed initially for starting the polymerization reaction, may range from about 0.1 to 15, preferably about 0.2 to 12 moles of the reducing agent, e.g. aluminum triethyl, per 1 mol of $TiCl_4$ or other reducible metal compounds. Generally the higher ratios, e.g. 1 to 12 moles of metal alkyl per 1 mol of $TiCl_4$ give polymers of the higher molecular weights, e.g. polyethylene of 100,000 to 3,000,000 or more Staudinger molecular weight. On the other hand, catalyst ratios of 0.2 to 1 mole of metal alkyl per 1 mol of $TiCl_4$ generally give polymers, e.g. polyethylene, of substantially lower molecular weights in the range of 5,000 to 100,000. The molecular weight obtained also varies somewhat according to other polymerization conditions, e.g. the overall catalyst concentrations in respect to the diluent present, as well as the type of diluent, catalyst preparation temperature and time, and also the polymerization temperature.

The diluent to be used may be a substantially inert volatile or volatilizable organic liquid, but preferably is an inert paraffinic hydrocarbon having a boiling point within the limits of about 50° to 300° C., such as hexane, heptane, octane or dodecane, refined petroleum fractions such as heavy naphtha, kerosene, or gas oil fractions. For instance, a petroleum fraction boiling from 204° to 260° C. and heavily acid treated to remove olefins and aromatic unsaturates is quite suitable. However, aromatic hydrocarbons may also be used such as benzene, toluene, etc., or mixed petroleum aromatic solvents, e.g. having a boiling range between 40° and 300° C. It is desirable, though, that the inert diluent be substantially free from compounds having aliphatic unsaturation, e.g. olefins, diolefins, etc. Other diluents may be used such as halogenated aromatic compounds, e.g. orthodichlorobenzene, chlorinated naphthalene, etc. A convenient method of adding the catalyst components is to dissolve each in a portion of the diluent and then mix the resulting solution to make the initial combination catalyst. Additional diluent may be added either directly at the start of the polymerization or later during the course of the polymerization to prevent an undue thickening of the reaction mixture due to formation of solid polymer particles.

The concentration of catalyst components to be used may vary somewhat according to the other polymerization reaction factors, but normally range from about 0.1 to 10 grams of total combination catalyst per 100 ml. of diluent, at the start of the polymerization reaction, to be followed, if desired, by additional diluent which may amount to an additional 100 or 200 volumes per 100 volumes at the start of polymerization.

The catalyst preparation temperature should be about 0° C. to 100° C., preferably about 30° C. to 50° C. and generally it is preferred to maintain the resulting catalyst mixture or complex in a state of an agitated slurry for a time of about 10 minutes to an hour, preferably about 15 to 45 minutes to permit the combination catalyst to develop a desired state of catalytic activity.

The above mentioned preparation of the catalyst may either take place directly in the polymerization reactor or in a separate catalyst preparation zone from which it may be transferred when ready into the polymerization reactor. If additional diluent is to be added this should be done after the catalyst has been prepared and the entire catalyst dispersion should then be brought to the desired polymerization starting temperature which may range from about 20° C. (or room temperature) up to about 100° C., but is preferably about 30 to 50° C., there being generally a further increase in temperature during the course of polymerization. The main operating temperature may be desirably kept in the range of 30° to 80° C. but generally should be about 40 to 70° C.

It should be noted that all equipment used for storage, preparation, transfer, or utilization of the catalyst components and mixed catalyst slurry should be blanketed with suitable inert gas such as nitrogen, because the catalyst components are inflammable and combustible.

When the catalyst-diluent dispersion had been brought to the desired polymerization temperature, the olefin to be polymerized, e.g. ethylene, is contacted with the catalyst dispersion, e.g. by bubbling the ethylene gas through the catalyst-diluent slurry, preferably while maintaining the latter well agitated. Before contacting with the catalyst, it is also desirable that the olefin be purified for removal of harmful trace impurities, e.g. oxygen, $H_2O$, etc. e.g. by dehydration through activated alumina or contacting with a solution of aluminum triethyl, such as by scrubbing the gas with an n-heptane solution of aluminum triethyl.

Polymerization occurs, and the temperature is permitted to rise to the desired operating temperature, with application of cooling, e.g. by refrigerating jacket, to prevent overheating.

Now, according to the present invention, when the reaction begins to subside, small additional amounts of both separate catalyst components are added directly to the polymerization reaction liquid in an amount equal to about 0.001 to 1 percent by weight based on the diluent added. For instance, a solution of about 0.1 to 10 grams of reducing agent, e.g. aluminum triethyl, or diethyl aluminum chloride, dissolved in 100 ml. of heptane, and also 0.1 to 10 grams, preferably about 0.2 to 5 grams of $TiCl_4$, or other reducible metal compound, dissolved in 100 ml. of heptane, are each separately added directly to the agitated reaction liquid. These subsequent additions of separate catalyst components may take place periodically or continuously, after the polymerization reaction has once been started with a suitable combination or complex catalyst formed from a mixture of the two separate components.

Although the polymerization reaction can be carried out adequately at atmospheric pressure, it is possible to use slightly superatmospheric pressures up to 5 or 10 atmospheres or so.

After the polymerization has been carried out either to the desired catalyst efficiency, as indicated by the production of preferably 50 to 100 grams or more of polymer per gram of catalyst, in the case of batch operation, or until reactor equipment becomes fouled by deposition of polymer on the surfaces of the equipment coming in contact with the reaction liquid, the reaction may be stopped by adding a catalyst deactivator, e.g. by the addition of 0.1 to 1 volume of an alcohol, preferably one having 2 to 8 carbon atoms, e.g. ethyl, isopropyl, butyl, isobutyl or pentyl alcohol per volume of polymerization reaction slurry. The alcohol may be added with or without a filtration or other separation step serving to remove solid polymer from diluent and any other liquid constituents. After the alcohol addition the polymer is then recovered from the resultant slurry by suitable means such as filtration, centrifuging, etc., and then is preferably washed by stirring with additional amounts of butyl alcohol or other solvent to remove residual traces of catalyst entrained in the polymer. The washed polymer, generally in the form of a granular or powdered material, may then be dried, e.g. by heating and/or vacuum, and packaged in such granular form or after pelletizing.

Instead of $TiCl_4$, one may use other reducible compounds of a metal of groups IV–B, V–B, and VI–B of the periodic table, including, for example, halides, oxides, hydroxides, alcoholates, acetal acetonates, etc. of the metals including Ti, Zr, Hf, V, Nb, Ta, Cr, Mo, and W, or group VIII metals, e.g. Fe, Ni, Pd, and Mn, these group VIII metal compounds, e.g. $FeCl_3$ or $MnCl_2$, being especially useful with reducing agents of the dialkyl aluminum halide type. Other examples of particularly useful reducible compounds are $ZrCl_4$, $WCl_6$, $CrCl_6$, $MoCl_6$, etc.

As an illustration of this invention, the following experimental data are given.

*Example I*

A continuous run of approximately 10½ hours in duration was made in a glass unit. The reactor consisted of a 4-liter cylindrical flask equipped with a high speed Morton stirrer. The start-up procedure for this run consisted of pumping in 100 cc. of each catalyst component, heating to 120° F. (49° C.) for 10 minutes, adding diluent to give a total concentration of about .35 weight percent of catalyst and then starting in the $C_2H_4$. Ethylene gas and diluent (n-heptane) were introduced through the same line. Solutions of .05 M (molar) $Al(C_2H_5)_2Cl$ and of .05 M $TiCl_4$ in n-heptane were separately pumped continuously into the reactor at rates of 100–200 cc./hr. to give catalyst concentrations (weight percent on diluent) of the order of .30 to .40. An over-all catalyst efficiency of 54 grams/gram was obtained in this run, with brief periods when a high of 70–90 grams/gram were obtained as calculated from ethylene adsorption data.

This example shows that catalyst polymerization activity may be renewed during the course of reaction, by continuous addition of the aluminum alkyl compound and $TiCl_4$ components of the combination catalyst.

The following additional examples will illustrate various alternative ways in which this invention can be carried out.

*Example II*

The process described in Example I can be duplicated except that after starting the reaction with the combination catalyst, the additional aluminum diethyl chloride and $TiCl_4$ are added in several successive portions, e.g. periodically every 10 minutes, or every 30 minutes, instead of continuously.

Example III

Example I may be duplicated except for the substitution of aluminum triethyl in place of diethyl aluminum chloride, both in the original preparation of the catalyst, and later in the addition of extra aluminum alkyl compound after the original polymerization activity has started to subside.

Example IV

Ethylene can be polymerized by continuously charging into one end of a continuous reactor a suitable diluent, e.g. n-heptane, etc., a solution of $TiCl_4$ in n-heptane (as in Example I), a separate solution $Al(C_2H_5)_2Cl$ in n-heptane in corresponding concentration, and ethylene gas, and at a later stage in the polymerization, i.e. at a point intermediate between the inlet for the above-mentioned feed materials and the discharge point, feeding continuously an additional amount of each of the two separate solutions of catalyst components, i.e. $TiCl_4$ and $Al(C_2H_5)_2Cl$, the additional amounts fed here being about one-half of the catalyst concentration fed at the inlet of the reactor, continuously adding additional diluent as desired to maintain the desired fluidity and viscosity, and finally discharging the entire reaction mixture slurry, to recover the polymer therefrom.

Example V

Example IV can be further modified by filtering the final reaction mixture slurry, and recycling the filtrate which contains some dissolved catalyst components, back to the inlet zone of the reactor.

It is not intended that this invention be limited to the specific examples and modifications which have been given merely for the sake of illustration, but only by the appended claims in which it is intended to claim all novelty inherent in the invention, as well as all modifications coming within the scope and spirit of the invention.

What is claimed is:

1. Process for polymerizing ethylene at a temperature of about 30–80° C. under a pressure of about 1 to 10 atmospheres, comprising making a complex of an aluminum alkyl compound selected from the group consisting of diethyl aluminum chloride, diethyl aluminum bromide and triethyl aluminum and $TiCl_4$, the molar ratio of aluminum alkyl compound to titanium compound being in the range of about 0.2:1–12:1, in a paraffinic hydrocarbon having a boiling point within the limits of about 50° to 300° C. as inert diluent, agitating the resulting catalyst slurry while heating to activate same, feeding ethylene gas into said slurry to be polymerized to form a polyethylene slurry in said diluent, thereafter adding additional amounts of aluminum alkyl compound and of $TiCl_4$ solution separately to the resulting reaction mixture, mixing the added catalyst component in the reaction mixture, and finally recovering polyethylene from the reaction mixture.

2. Process for polymerizing ethylene at a temperature of about 30 to 80° C. under a pressure of about 1 to 10 atmospheres, comprising making a complex of aluminum triethyl and $TiCl_4$, in about equimolar proportions, in n-heptane as inert diluent, agitating the resulting catalyst slurry, feeding ethylene gas into said slurry to be polymerized to form a polyethylene slurry in said diluent, adding additional amounts of aluminum triethyl and of $TiCl_4$ in hydrocarbon solutions as separate liquid streams to the resulting polymerization mixture when the polymerization activity of the original catalyst preparation starts to diminish, mixing the added catalyst components in the polymerization mixture, and finally recovering polyethylene from the resulting reaction mixture.

3. Process for polymerizing ethylene at a temperature of about 30–80° C. under a pressure of about 1 to 10 atmospheres, comprising making a complex of diethyl aluminum chloride and $TiCl_4$, in about equimolar proportions, in n-heptane as inert diluent, agitating the resulting catalyst slurry while heating to activate same, feeding ethylene gas into said slurry to be polymerized to form a polyethylene slurry in said diluent, thereafter adding additional amounts of diethyl aluminum chloride and of $TiCl_4$ solutions separately to the resulting reaction mixture, mixing the added catalyst components in the reaction mixture, and finally recovering polyethylene from the reaction mixture.

References Cited in the file of this patent

UNITED STATES PATENTS

| | | |
|---|---|---|
| 2,590,539 | Hudson | Mar. 25, 1952 |
| 2,691,647 | Field et al. | Oct. 12, 1954 |
| 2,728,754 | Evering et al. | Dec. 27, 1955 |

FOREIGN PATENTS

| | | |
|---|---|---|
| 534,792 | Belgium | Jan. 31, 1955 |
| 533,362 | Belgium | May 16, 1955 |